United States Patent

[11] 3,602,117

| [72] | Inventors | John H. Eagle, deceased<br>late of Irondequoit, N.Y.;<br>by Lee A. Eagle, executrix, Irondequoit, N.Y.; Lincoln Rochester Trust Co., executor, Rochester, N.Y.; Allen G. Stimson, Brighton, N.Y. |
|------|-----------|---|
| [21] | Appl. No. | 853,220 |
| [22] | Filed | Aug. 26, 1969 |
| [45] | Patented | Aug. 31, 1971 |
| [73] | Assignee | Eastman Kodak Company<br>Rochester, N.Y. |

[54] ENCODED FILM HOLDER
3 Claims, 18 Drawing Figs.

[52] U.S. Cl. .................................................. 95/10 C,
95/31 FS, 352/72, 352/78
[51] Int. Cl. ..................................................... G03b 17/26,
G03b 19/04, G03b 19/18
[50] Field of Search........................................... 95/10 C,
31, 64; 352/72, 78, 141

[56] References Cited
UNITED STATES PATENTS

| 3,208,363 | 9/1965 | Easterly et al. ............... | 352/72 |
| 3,314,344 | 4/1967 | Anwyl et al. .................. | 352/72 X |
| 3,402,650 | 9/1968 | Hoadley ....................... | 95/10 C |
| 3,425,326 | 2/1969 | Von Wasielewski ........ | 352/72 X |
| 3,492,927 | 2/1970 | Thiele et al. ................. | 352/78 X |

Primary Examiner—Joseph F. Peters
Attorneys—Robert W. Hampton and William C. Dixon, III.

ABSTRACT: A film holder is encoded by means of an aperture and/or a filter in accordance with one or more photographic characteristics of film contained therein to control the amount and/or type of scene light passing to a photocell of an exposure-control system in an associated camera to adjust said system in accordance with said one or more characteristics.

PATENTED AUG 31 1971 3,602,117

JOHN H. EAGLE, DECEASED,
BY LEE A. EAGLE, EXECUTRIX, and
  LINCOLN ROCHESTER TRUST CO., EXECUTOR,
ALLEN G. STIMSON
                    INVENTORS BY *William C. Dixon*

*Robert W. Hampton*
                    ATTORNEYS

JOHN H. EAGLE, DECEASED,
BY LEE A. EAGLE, EXECUTRIX, and
LINCOLN ROCHESTER TRUST CO., EXECUTOR,

ALLEN G. STIMSON

INVENTORS

BY *William C. Oxton*

*Robert W Hampton*

ATTORNEYS

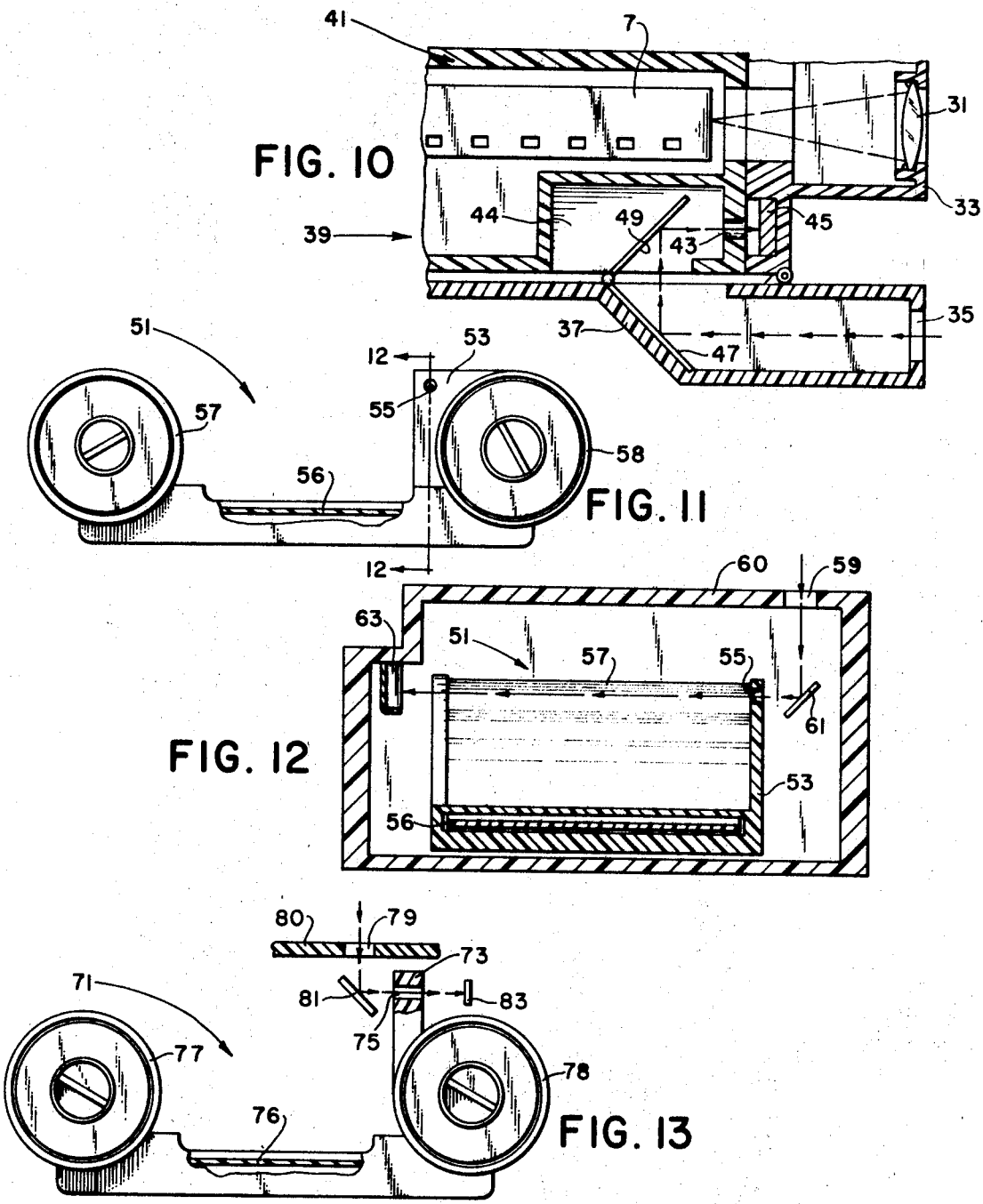

JOHN H. EAGLE, DECEASED,
BY LEE A. EAGLE, EXECUTRIX, and
LINCOLN ROCHESTER TRUST CO., EXECUTOR,

ALLEN G. STIMSON

INVENTORS

BY William C. Orton, III

Robert W. Hampton

ATTORNEYS

ENCODED FILM HOLDER

BACKGROUND OF THE INVENTION

1. Field of the Invention

This invention relates to means for adjusting the exposure-control system of a camera in accordance with one or more characteristics of film being used therein.

2. Description of the Prior Art

Conventional cameras commonly incorporate means for manually adjusting the camera according to the speed of film loaded therein, the speed being designated by its ASA number. The inconvenience of manual adjusting means in a camera is readily apparent. The process of adjusting the camera according to the speed of film loaded therein takes time. If an erroneous setting is made, or if it is omitted, an entire roll of film may be wasted. If the photographer loads the camera and throws away the film wrapper, he may not remember what setting to make. Even if the ASA number is indicated on the film container, once the film is loaded and advanced in the camera, to open the camera and read the film speed would result in the loss of several frames of film.

Since the introduction of automatic exposure-control systems in cameras, various electrical and mechanical means have been provided for automatically adjusting such cameras in accordance with one or more photographic characteristics of film being used therein to obviate such manual settings as those described above. Purely mechanical means, such as notches in the film container for adjusting notch-responsive mechanical members in the exposure-control system, have certain disadvantages. The incorporation of delicate members and complex linkages requisite to such a camera system is time consuming and expensive in manufacture, and presents a possible source of mechanical failure in an already-delicate instrument. Likewise, the use of electrical elements, such as resistors whose resistance varies with film speed and which are affixed to the film container, requires additional operations and parts in manufacturing the film container, and the additional circuitry required in the camera is a potential source of difficulty in regard to the accuracy and life of the camera's exposure-control system.

In U.S. Pat. No. 3,402,650, entitled LIGHT DETECTOR SYSTEM FOR AUTOMATIC EXPOSURE CONTROL and issued Sept. 24, 1968, in the name of H. O. Hoadley, there is described a film magazine encoded with a light-diffusing surface having a reflective characteristic that is indicative of a parameter of film in the magazine, the light-diffusing surface serving to reflect scene light admitted thereto toward a photosensitive element in the photometric system of a camera in which the magazine is loaded, the amount and/or type of light thus received by the photosensitive element being effective to adjust the photometric system, and hence an exposure-control means coupled thereto, in accordance with the film parameter. Such a system overcomes certain of the disadvantages mentioned above with respect to purely mechanical or electrical systems, but an even simpler, less expensive, and more reliable means for adjusting the exposure-control system of a camera in accordance with one or more characteristics of film being used therein is desired, particularly for use with cartridge-loaded cameras in the amateur photographic field.

SUMMARY OF THE INVENTION

It is an object of the present invention, therefore, to provide an improved means for adjusting the exposure-control system of a camera by varying the light passing to a photoresponsive element therein according to one or more photographic characteristics of film being used in the camera.

It is another object of the invention to provide an improved means associated with a film container for adjusting a camera in accordance with one or more film characteristics by varying the amount and/or type of light passing to a photocell of an exposure-control system in the camera.

A further object is to provide an improved film container incorporating a light-varying encoder which can be used in cameras not adapted to utilize such an encoder.

Another object is to provide an automatic exposure-control system which can be adjusted in accordance with one or more characteristics of film being used in the camera by cooperating with an improved light-varying means on the film holder.

And another object is to provide an improved light-varying encoder that is adaptable for use with a variety of types of film holders and which is simple in design, economical to manufacture, and easy to use.

To meet these and other objects, the present invention comprises means for varying light passing to a photoresponsive portion of an exposure-control system in a camera to adjust the system in accordance with one or more parameters of film in the camera. The light-varying means may be calibrated according to such parameters as the speed and/or spectral sensitivity of the film; and it may comprise an aperture or slot in the film holder, or in a separate element associated therewith, having an area related to the film parameter for which the exposure-control system is to be adjusted; or it may comprise a filter having a density and/or a spectral characteristic similarly related to the film parameter for which the exposure-control system is to be adjusted.

The invention, and its objects and advantages, will become more apparent in the detailed description of the illustrated embodiments presented below.

BRIEF DESCRIPTION OF THE DRAWINGS

In the detailed description of the illustrated embodiments of the invention presented below, reference is made to the accompanying drawings, in which:

FIG. 10 is a partial sectional view showing schematically another alternative embodiment of the present invention;

FIGS. 11, 12, 13, and 14 are views showing still other alternative embodiments of the present invention;

DESCRIPTION OF THE ILLUSTRATED EMBODIMENTS

Figure 1:
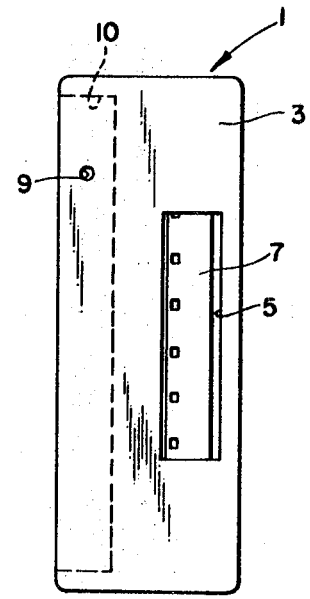
FIGS. 1 and 2 are a front view and a partial side view, respectively, of a motion picture film magazine encoded to indicate film speed, in accordance with the present invention, by means of an aperture.

Because certain parts of photographic and related apparatus are well known, the following description is directed in particular to those elements forming, or cooperating directly with, the present invention, elements that are not specifically shown or described herein being understood to be selectable from those known in the art.

The present invention comprises means associated with a film holder for varying light passing to a photometric system in a camera to adjust the system in accordance with one or more film parameters such as film speed and film spectral sensitivity. The light-varying means may comprise an aperture or slot either in the film holder itself or in an element associated therewith, whose area is related to, and indicative of, the film parameter for which the photometric system is to be adjusted. Alternatively or additionally, the light-varying means may comprise an optical filter whose density and/or color is related to, and indicative of, the film parameter. For example, if spectral sensitivity is to be compensated for, the filter would be such that only those colors of light to which the film is sensitive would be permitted to pass therethrough.

The type of exposure-control system to which the present invention relates comprises a photometric system having photodetection means for receiving illumination from the photometric scene to enable either manual or automatic adjustment of the shutter speed and/or diaphragm aperture to thereby permit properly exposed photographs upon actuation of the shutter. The exposure-control system itself, however, must also be adjusted in accordance with the characteristics of the film to be exposed, since some films are more photosensitive, or faster, than others and different types of film are sensitive to different parts of the electromagnetic-energy spectrum. Thus, for example, if a particular type of film were to have a slow film speed, such as 25 ASA and were partially insensitive to yellow light, such characteristics must be taken into consideration in setting the camera to obtain a proper exposure of the film. The present invention provides a simple but effective means of compensating for such film characteristics by controlling the amount and/or type of light striking the photodetection means of the photometric system.

The preferred and alternative embodiments of the invention to be described below have been the common feature of the provision of means for varying scene light passing to the photometric system. If only film speed is to be compensated for, the light-varying means would preferably comprise either an aperture, a slot, or a neutral-density filter associated with the film holder. That is to say, the light-varying means would preferably take the form of either an aperture or slot whose area is a direct function of the film speed or a filter whose density is an inverse function of the film speed. The light-passing capability of the light-varying means should increase with increasing film speed. Hence, the greater the film speed, the larger the aperture, or slot, or the lower the density of the filter. In the embodiments to be described, it should be understood that, although only one form of light-varying means may be referred to, the other may be used in its place. If only spectral sensitivity is to be compensated for, a spectrally sensitive filter should be used. If both film speed and spectral sensitivity are to be compensated for, either an aperture or slot of appropriate size should be covered by a spectrally sensitive filter or a filter of appropriate neutral density should be spectrally sensitive as well. With the foregoing understood, the illustrated embodiments of the invention will now be described with reference to the drawings.

The Preferred Embodiment

Figure 2:
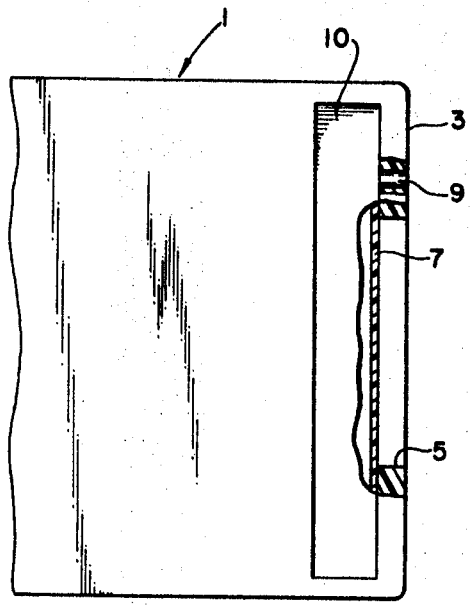

In FIGS. 1 and 2, a motion-picture camera film magazine 1 comprises a forward wall 3 having an opening 5, through which a strip of film 7 may be exposed, and a light-attenuating aperture 9 for effecting the adjustment of an exposure-control system in an associated camera (FIGS. 3 and 4) according to the speed of film 7. A recess 10 is provided in magazine 1 for a purpose to be described below.

Figure 3:
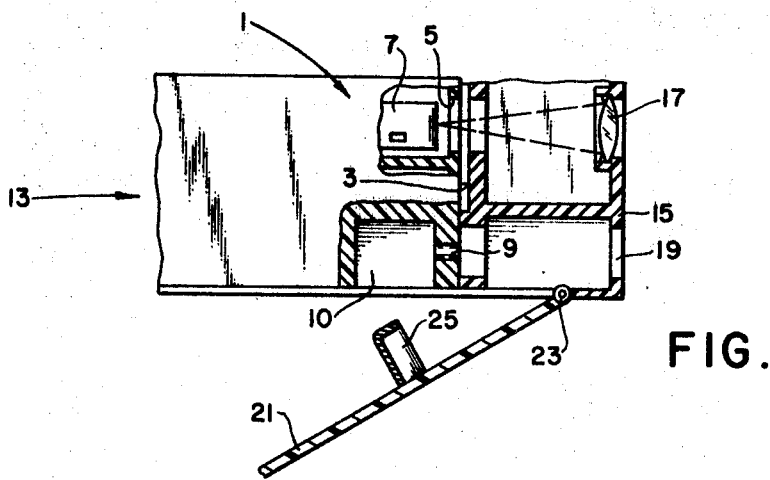
FIGS. 3 and 4 are partially schematic top views showing a portion of a camera adapted to receive the film magazine of FIGS. 1 and 2 and the means of adjusting an exposure-control system in the camera according to the present invention.
Figure 4:
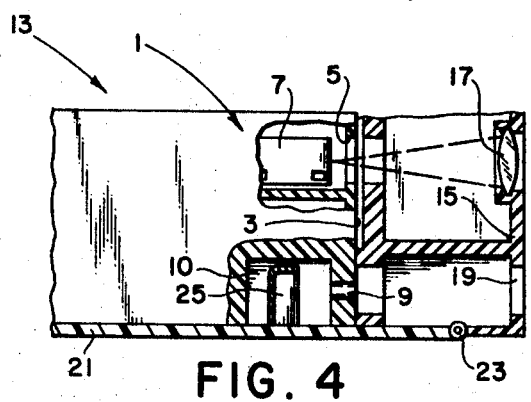

In FIGS. 3 and 4 is shown a chamber 13 in the camera for receiving film magazine 1. Referring to FIG. 3, the camera body has a forward wall 15 in which an exposure lens 17 and an aperture 19 are disposed. A door 21 provides access to chamber 13, in which magazine 1 is received as shown. Door 21 is pivotally mounted on the camera body by a hinge 23. Door 21 carries a photodetector 25 which is part of a photometric system in the camera, photodetector 25 being connected to the balance of the photometric system by means of flexible elements (not shown). The photometric system, in turn, is part of the camera's exposure-control system. The mode of operation of this embodiment is indicated in FIG. 4. After film magazine 1 is inserted into chamber 13, door 21 is closed and photodetector 25 is thereby positioned in recess 10 behind aperture 9. Scene light passing through aperture 19 is attenuated by aperture 9 to adjust the exposure-control system in accordance with the speed of film 7. The signal generated by photodetector 25 adjusts the exposure-control system to effect a proper exposure of film 7.

Alternative Embodiments

In FIGS. 5-9 is shown schematically the camera of FIGS. 3 and 4 with alternative embodiments of a film magazine according to the present invention inserted therein.

Figure 5:
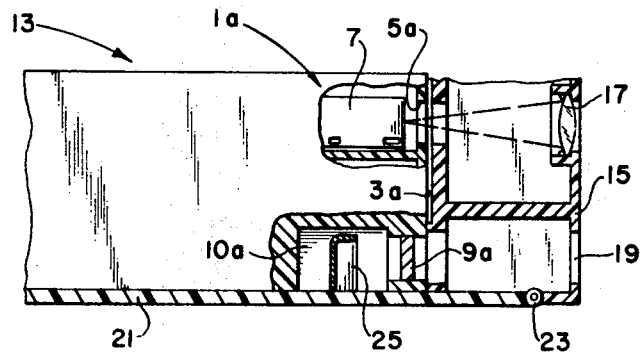
FIGS. 5, 6, 7, 8, and 9 are partially schematic top views of the portion of the camera illustrated in FIGS. 3 and 4, showing received therein alternative embodiments of film magazines encoded to indicate film speed and/or spectral sensitivity, in accordance with the present invention, by means of optical filters.

In FIG. 5, a film magazine 1a having a forward wall 3a and a recess 10a. corresponding to forward wall 3 and recess 10, respectively, of FIGS. 3 and 4, has inserted between forward wall 3a and recess 10a a neutral-density filter 9a. Neutral-density filter 9a serves the same purpose as does aperture 9 in film magazine 1, namely, the attenuation of scene light passing to photodetector 25, the density of filter 9a being related to, and uniquely indicative of, the speed of the film contained in magazine 1a. In all other respects, magazine 1a may be identical to magazine 1.

Figure 6:
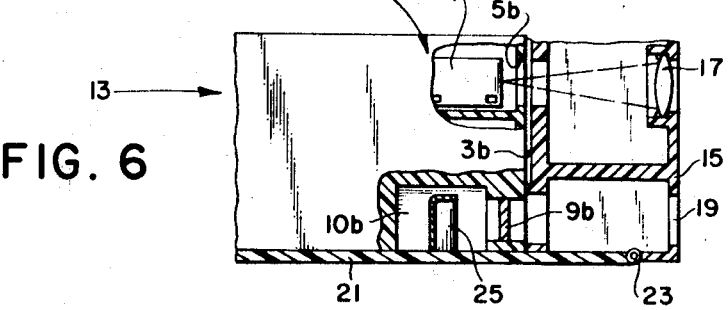

In FIG. 6, a similar film magazine 1b having a forward wall 3b and a recess 10b is shown wherein a spectrally sensitive filter 9b is mounted between wall 3b and recess 10b in place of the neutral-density filter 9a of FIG. 5. The function of filter 9b is to adjust the scene light received through camera aperture 19 in accordance with the spectral sensitivity of the film contained in magazine 1b, the color of filter 9b being related to, and uniquely indicative of, the spectral sensitivity of the film. In all other respects, magazine 1b may be identical to magazines 1 and 1a.

Figure 7:
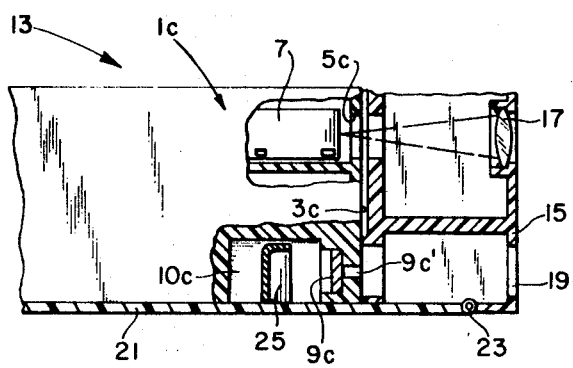

In FIG. 7, a similar film magazine 1c having a forward wall 3c and a recess 10c is shown wherein a spectrally sensitive filter 9c and an aperture 9c' are included between wall 3c and recess 10c. The function of filter 9c is the same as that of filter 9b of FIG. 6, namely, the adjustment of scene light passing to photodetector 25 in accordance with the spectral sensitivity of the film contained in the magazine. The function of aperture 9c' is the same as that of aperture 9 in FIGS. 3 and 4, namely, the attenuation of scene light passing to photodetector 25 in accordance with the speed of the film. In this embodiments the color of filter 9c and the size of aperture 9c' are related to, and uniquely indicative of, the spectral sensitivity and the speed, respectively, of the film contained in magazine 1c to adjust the camera's exposure-control system accordingly. In all other respects, magazine 1c may be identical to magazines 1, 1a, and 1b.

Figure 8:
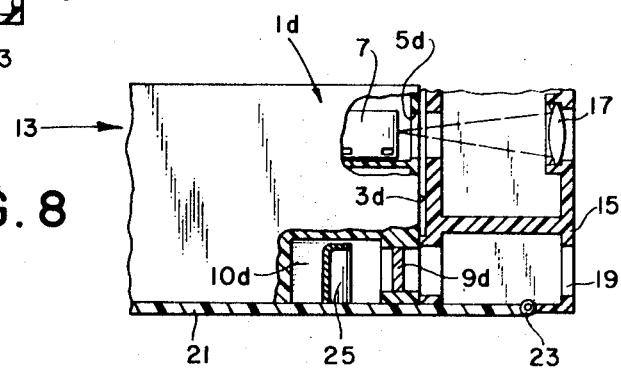

In FIG. 8, a similar film magazine 1d having a forward wall 3d and a recess 10d is shown wherein a filter 9d is mounted between wall 3d and recess 10d, filter 9d having both a density and a color that are related to, and uniquely indicative of, the speed and spectral sensitivity, respectively, of the film contained in magazine 1d to adjust the camera's exposure-control system accordingly. In all other respects, magazine 1d may be identical to magazines 1, 1a, 1b, and 1c.

Figure 9:
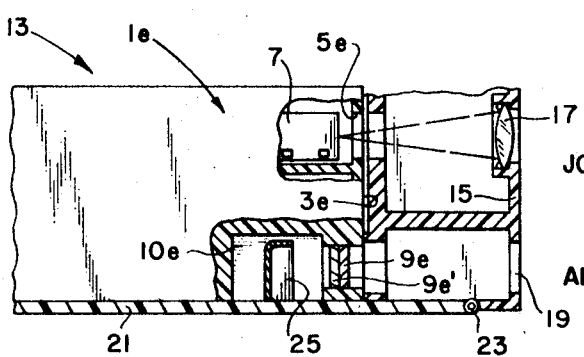

In FIG. 9, a similar film magazine 1e having a forward wall 3e and a recess 10e is shown wherein a spectrally sensitive filter 9e and a neutral-density filter 9e' are mounted between wall 3e and recess 10e, the color of filter 9e and the density of filter 9e' being related to, and uniquely indicative of, the spectral sensitivity and speed, respectively, of the film contained in magazine 1e to adjust the camera's exposure-control system accordingly. In all other respects, magazine 1e may be identical to magazines 1, 12, 1b, 1c, and 1d.

Thus it will be seen that, in the embodiments illustrated in FIGS. 5-9, the objects of the present invention are achieved by means of one or more filters in place of, or in addition to, the aperture described with reference to the embodiment of FIGS. 1-4.

Another alternative embodiment of the invention is illustrated in FIG. 10. An exposure lens 31 is mounted in a forward wall 33 of the body of a movie camera. An aperture 35 is disposed in a forward-facing portion of a door 37 which provides access to a chamber 39 for receiving a film magazine 41 having a film-speed-encoding aperture 43 and a recess 44 therein as shown. A photodetector 45, corresponding to photodetector 25 of FIGS. 3-9, is mounted on the camera body rather than on the door 37, thus eliminating the need of a flexible connection between the photodetector and the rest of the camera's photometric system (not shown). A pair of mirrors 47 and 49 are mounted on door 37 so that light passing through aperture 35 is directed through encoding aperture 43 to photodetector 45 when door 37 is closed, mirror 49 being positioned behind aperture 43 within recess 44 upon closing of door 37.

Other alternative embodiments of the invention, relating to film cartridges for instant-loading-type still cameras, are shown in FIGS. 11–14. In FIG. 11, a cartridge 51 is provided with an integral web 53 having an encoding aperture 55, and/or a filter, for calibrating the cartridge in accordance with the speed and/or spectral sensitivity of film contained therein. Web 53 lies outside the path of film advancement and outside the film exposure area 56. Aperture 55 is generally parallel with the axes of a pair of film spool housings 57 and 58, and is generally perpendicular to the path of light entering an associated camera for passage therethrough. In FIG. 12 is shown schematically a portion of the associated camera with film cartridge 51 inserted therein. An aperture 59 is provided in a forward wall 60 of the camera body. A mirror 61 and a photodetector 63 are disposed in the camera body so that, when cartridge 51 is inserted as shown, encoding aperture 55 falls in the optical path of light that is admitted through aperture 59 and reflected by mirror 61 toward photodetector 63.

A similar embodiment is shown in FIG. 13. A film cartridge 71 comprises a pair of film spool housings 77 and 78 and an integral web 73 extending from the inner side of spool housing 78 in a plane generally parallel with the longitudinal axes of the spool housings and perpendicular to the film plane 76. Web 73 is located so that the exposure path to the film in the cartridge is not blocked. An encoding aperture 75, and/or a filter, is provided in web 73 so that its polar axis is perpendicular to the longitudinal axes of the spool housings. When cartridge 71 is inserted in a camera as shown, light passing through an aperture 79 in a forward wall 80 of the camera body is reflected by a mirror 81 mounted on the camera body, through encoding aperture 75, to a photodetector 83.

Figure 14:
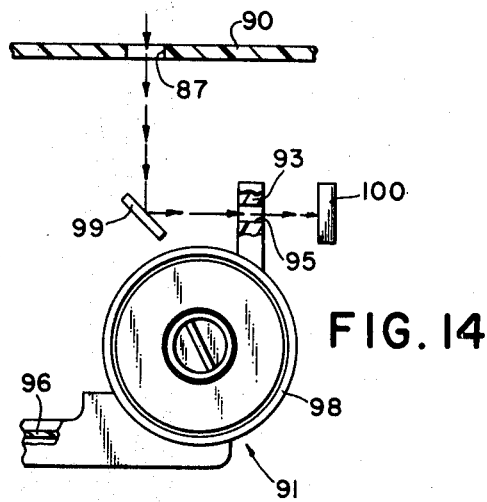

In a closely related embodiment, illustrated in FIG. 14, an encoding aperture 95, and/or a filter, is provided in an integral web 93 in a manner similar to that described with reference to the embodiment of FIG. 13. Here, however, the web 93 is provided on the outer side of a spool housing 98 in a plane generally parallel with the axis of spool housing 98 and perpendicular to the film plane 96. Light passing through an aperture 87 in a forward wall 90 of the camera body is reflected by a mirror 99 mounted in the camera body, through an encoding aperture 95, to a photodetector 100.

Figure 15:
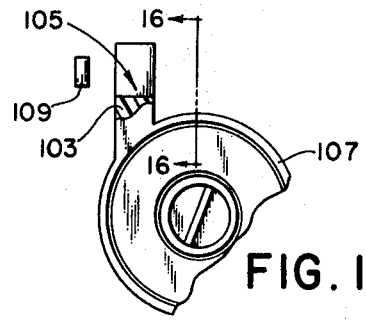
FIGS. 15 and 16 are views showing yet another alternative embodiment of the present invention.
Figure 16:
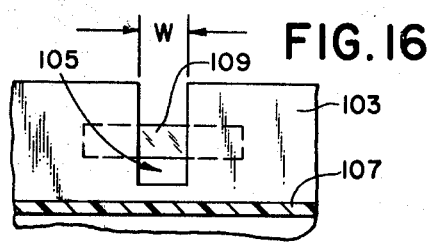

Still another alternative embodiment is illustrated in FIGS. 15 and 16, which are partial front and sectional views, respectively, of an integral web 103 extending from the outer side of a spool housing 107 as described above with reference to the embodiment of FIG. 14. As shown, the encoding aperture of previously described embodiments is here replaced by a slot 105 whose width W is a function of the film speed. A photodetector 109 is positioned in the camera (not shown) to extend across slot 105 and is of sufficient length to span the widest slot width with which the camera could be expected to function. As previously explained with reference to an encoding aperture, a filter may alternatively or additionally be used to compensate for film spectral sensitivity. Although slot 105 is depicted as being in an integral web, a slot no more than an aperture need be limited to such a location. The use of a slot rather than an aperture may facilitate manufacture of the cartridge because the only critical dimension of the slot is its width W.

Figure 17:
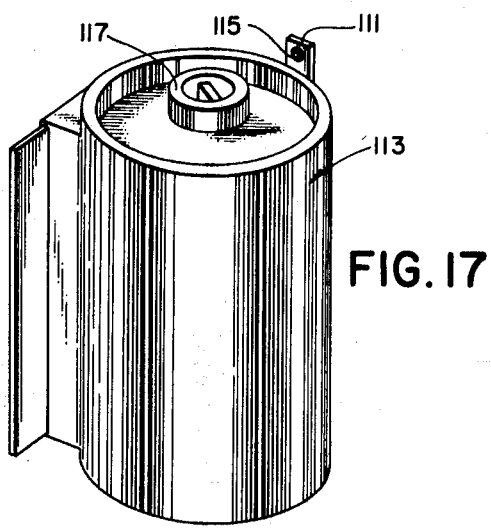
FIGS. 17 and 18 are views showing still further alternative embodiments of the present invention.
Figure 18:
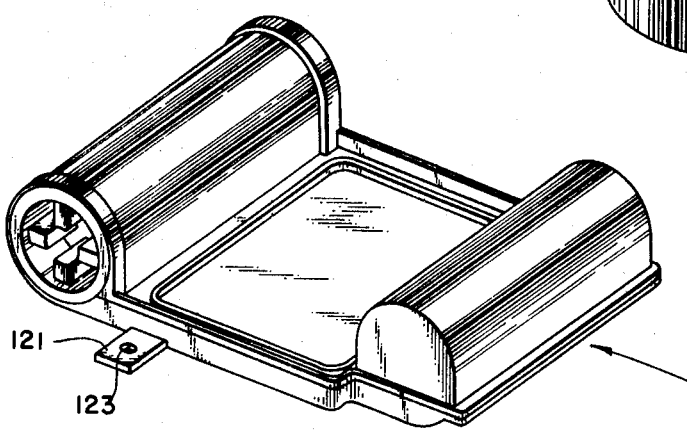

Still further alternative embodiments of the invention are illustrated in FIGS. 17 and 18. In these embodiments, a common feature is the provision of a film container having a removable tab that carries the encoding means, the tab being removable to permit the film container to be inserted in a camera that is not adapted to accommodate the tab or in a camera that is adapted to receive the film container and tab separately. The encoding means on the tab may comprise an aperture, a slot, a filter, or an aperture or slot combined with a filter. In FIG. 17, a tab 111 extends from a peripheral portion of a cylindrical film cartridge 113 in a direction parallel with the longitudinal axis of the cartridge, tab 111 having encoding means such as an aperture 115. A similar arrangement is illustrated in FIG. 18, wherein a tab 121 having an encoding aperture 123 extends from an edge portion along the film plane of an instant-load-type of still camera cartridge 125. The form and structure of the tab depend on the type of film container and the camera for receiving it. Generally, the camera would be provided with an aperture in its forward wall to admit light that would then be varied by the encoding means on its way to a photodetector, as previously described. If the tab is designed to remain on the film container, there should be nothing blocking the light path thereto. Hence either spindle 117 of film container 113 should terminate below the level of encoding aperture 115 or locating means should be provided in the camera to prevent the film container from being loaded in such a manner that spindle 117 could block the light path to the tab. Tabs 111 and 121 preferably are removable to enable the film container to be received by a conventional camera or to be usable with a camera adapted to receive the tab and the container separately. The base of a removable tab could therefore be made weaker than the surrounding material so that it could be snapped off easily and cleanly, such as by the use of perforations or a lesser material thickness than that of the surrounding material. Conversely, means could be provided on the container for detachably receiving a separately supplied encoding tab.

The invention has been described in detail with particular reference to the illustrated preferred and alternative embodiments thereof, but it will be understood that variations and modifications can be effected within the spirit and scope of the invention.

What is claimed is:
1. The combination comprising:
   a. a camera including an automatic exposure-control system; and
   b. a film magazine holding film in said camera and including means defining an aperture for transmitting electromagnetic radiation directed thereto from outside said camera, said film magazine further including means defining a recess for receiving a photosensitive element;
   c. said automatic exposure-control system including photoresponsive means for receiving radiation from said aperture, said photoresponsive means including a photosensitive element positioned in the recess in the magazine in alignment with said aperture for exposure to electromagnetic radiation transmitted through said aperture, the area of said aperture being directly related to and uniquely indicative of the sensitivity of said film.

2. In a camera comprising (a) a chamber adapted to receive a removable film magazine having means defining an opening for transmitting light and (b) exposure-control means including a photoresponsive element, the improvement which comprises:
   a. means defining a light-transmitting passageway for directing light from outside the camera to said chamber;
   b. means for supporting said photoresponsive element in a position to receive light transmitted through said passageway to said chamber and through said opening in the film magazine; and
   c. means mounting said photoresponsive element for movement into and out of alignment with said passageway.

3. A film magazine receivable by a camera and containing film of a given sensitivity to actinic radiation, said magazine having radiation control means thereon including means defining a passageway for transmitting actinic radiation received at an inlet end thereof to an outlet end thereof, said passageway having an area transverse to the direction of said radiation which is directly related to and uniquely indicative of said film sensitivity, and said magazine having means defining a recess for receiving a photosensitive element, said recess being located at the outlet end of said passageway and being located with respect to said passageway so that actinic radiation transmitted through said passageway can be directed into said recess.